United States Patent [19]

Willis

[11] Patent Number: 5,788,450

[45] Date of Patent: Aug. 4, 1998

[54] NARROW SELF-PROPELLED TRANSPORTATION APPARATUS

[76] Inventor: Allen R. Willis, 2135 Azore Ct., Jacksonville, Fla. 32216

[21] Appl. No.: 676,037

[22] Filed: Jul. 5, 1996

[51] Int. Cl.⁶ .................................................. B60P 1/48
[52] U.S. Cl. .......................... 414/555; 414/23; 180/908
[58] Field of Search ........................ 414/23, 486, 487, 414/543, 547, 549, 550, 555; 280/79.6; 180/306, 908

[56] References Cited

U.S. PATENT DOCUMENTS

| | | | |
|---|---|---|---|
| 3,666,126 | 5/1972 | Rempel | 414/408 |
| 3,937,340 | 2/1976 | Grove | 414/23 X |
| 4,552,501 | 11/1985 | Clark et al. | 414/555 X |
| 4,639,186 | 1/1987 | Mellgren | 414/23 X |
| 4,984,961 | 1/1991 | Herolf | 414/555 X |
| 5,599,157 | 2/1997 | Ellington | 414/555 X |
| 5,662,451 | 9/1997 | Muzzi et al. | 414/543 X |

FOREIGN PATENT DOCUMENTS 2268152  1/1994  United Kingdom ............. 414/555

*Primary Examiner*—James W. Keenan
*Attorney, Agent, or Firm*—Arthur G. Yeager

[57] ABSTRACT

Machine for picking up limb and trunk portions of trees and other types of vegetation and transporting the portions through narrow passageways like a chain link gate. This machine is especially useful in populated areas for collecting branches and tree trunks from pruning or removal operations and moving them from closely spaced backyards or houses, walks and narrow gates to a truck at the curb of a street without damage to the lawns or walks.

20 Claims, 3 Drawing Sheets

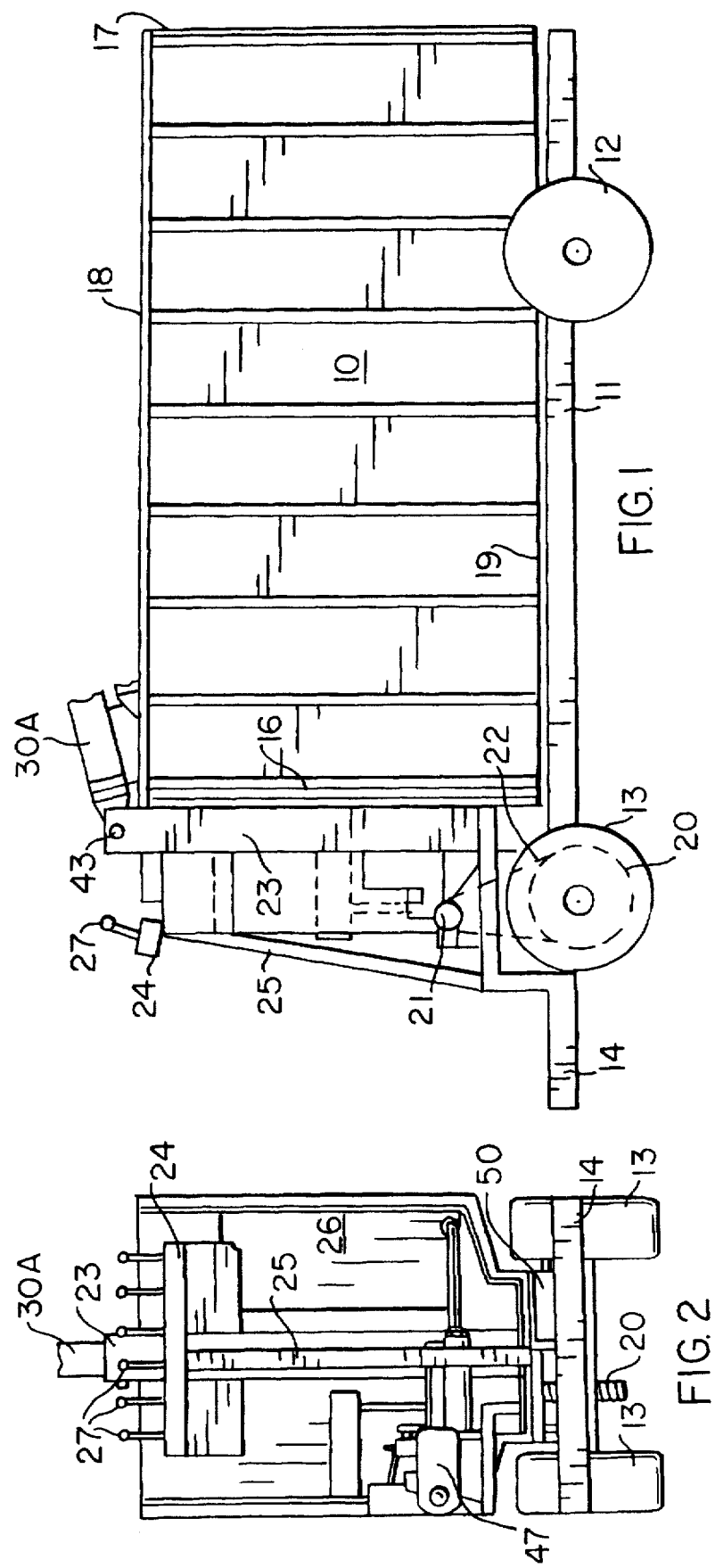

5,788,450

NARROW SELF-PROPELLED TRANSPORTATION APPARATUS

TECHNICAL FIELD

This invention relates to machinery for use by arborists in lifting and transporting tree debris from pruning and removal operations around homes and office buildings.

BACKGROUND OF THE INVENTION

There are many prior art large machines that are used in the logging industry to fell, delimb, cut, load and remove cut trees from wooded areas. However, for the professional arborists usually problems are encountered due to congested areas, like city homes, lawns, drives, walks, fences and narrow gates. Most of the jobs, perhaps about 80%, of tree pruning and/or removal occurs where the large pieces of machinery cannot have ready access for one or more of the problems listed above. These same problems are substantially eliminated in accord with this invention.

In accord with this invention a machine be maneuvered from backyards of houses and narrow gates and is equipped with the necessary facilities to pick up large logs and branches, load them onto a narrow walled platform, and self-propelled and steered out of the congested area for eventual disposal of the logs and branches at the street curb. It is an object of this invention to provide a machine that can be operated by a single person to accomplish the above purposes. It is another object of this invention to provide a machine that makes full use of hydraulic apparatus for lifting loads and for moving the loads to a more convenient area for disposal of the waste tree portions without damage to lawns, or walks or drives. Other objects will become apparent in the more detailed descriptions which follow.

BRIEF DESCRIPTION OF THE INVENTION

This invention relates to a maneuverable, self-propelled apparatus for transporting tree debris from pruning and removal operations and fallen trees where the apparatus includes a long narrow body with high sidewalls and with the body mounted on an undercarriage having four pneumatic-tired wheels. An upright mast is mounted on the body and supports an articulated arm of several sections and ending in opposed grapple fingers powered by hydraulic cylinders so as to be capable of picking up logs and depositing them in the body. The apparatus is long and narrow so as to be maneuverable in locations where there are narrow gates of 36 inch widths.

In one specific embodiment one of the sections of the articulated arm is telescopically extensible. In another specific embodiment the body is long and narrow enough to be maneuvered into narrow spaces, and the top and rear of the body are open so as to make easy loading of logs and branches. Other specific advantages and novel features will be described in the following description.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a side elevational view of the apparatus of this invention;

FIG. 2 is a front elevational view of the apparatus of this invention;

DETAILED DESCRIPTION OF THE INVENTION

Figure 3:
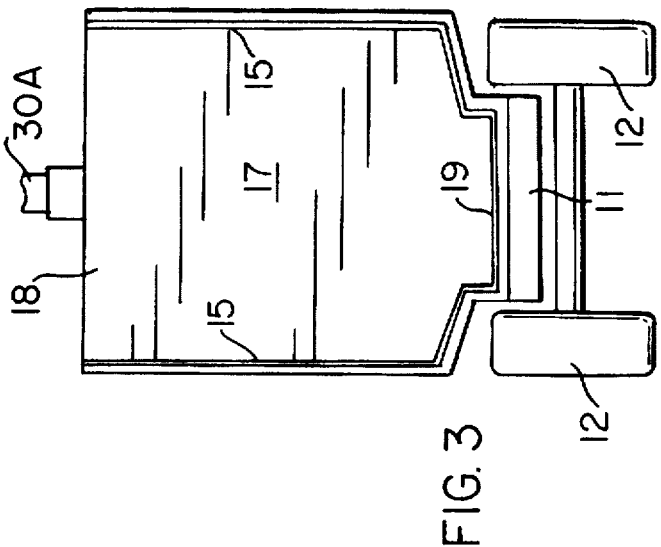
FIG. 3 is a rear elevational view of the apparatus of this invention.
Figure 4:
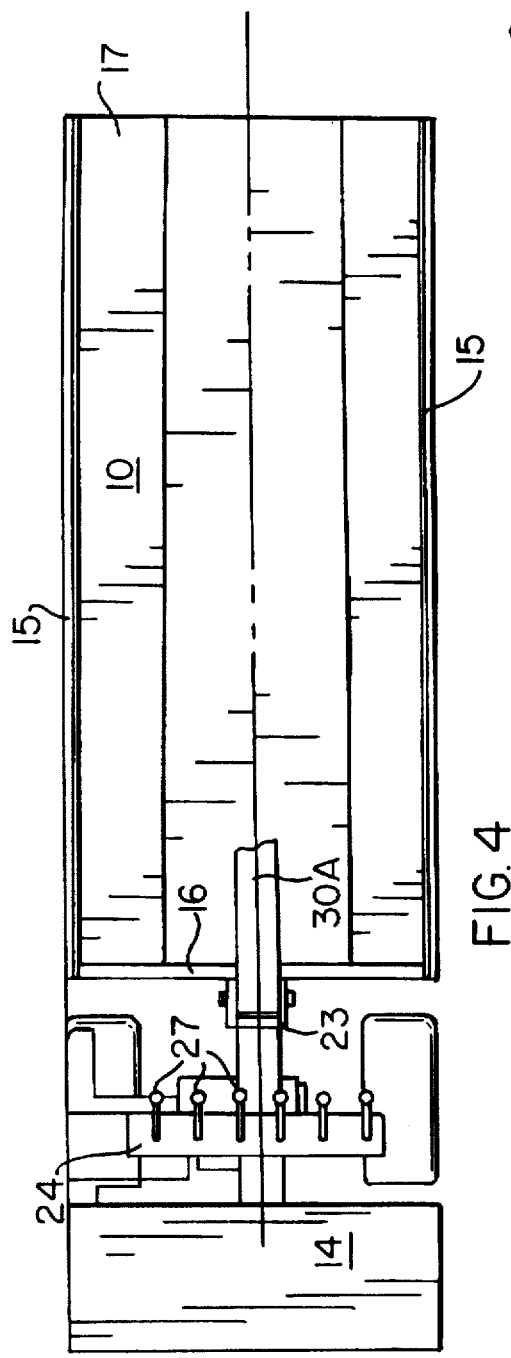
FIG. 4 is a top plan view of the apparatus of this invention.

The accompanying drawings of FIGS. 1-6 are illustrative of the features of this invention, wherein reference numerals relate to parts of the apparatus, the same numbers being used in different drawings to represent the same part.

In FIGS. 1-4 there is shown the apparatus which is the subject, of this invention. The apparatus is a self-propelled vehicle which is designed to be moved into areas where several trees may be growing and from which fallen trees, branches, and the like should be removed from around homes and offices, particularly backyards and the like. The apparatus includes a body 10 supported on an undercarriage 11 which, in turn is mounted on wheels 12 and 13. The apparatus can be driven by a single driver standing on platform 14, and the apparatus carries a mast 23 which supports an articulated boom or arm that is shown in FIG. 5 and described below.

With particular attention to FIGS. 1-4 the apparatus has a body 10 designed to be loaded with logs, branches and the like. The body 10 includes two parallel sidewalls 15, front wall 16 and bottom wall 19, with an open rear 17 and an open top 18 as entrances to the carrying space of body 10.

Extending forward of front wall 16 is platform 14 upon which the driver stands while operating the apparatus. All of the controls and operating mechanisms are generally located on the forward side of front wall 16 so as to be readily available to the operator standing on platform 14. A bank 24 of six levers 27 supported by beam 25 is available for the operation of hydraulic equipment used to operate the functions of the apparatus. A gasoline internal combustion engine 47 is the source of all power provided by or used by the apparatus. Oil stored in tank 26 is pumped under pressure by a gear pump (not shown) to the various cylinders and other apparatus using pressurized oil to do various operations. One use of the pressurized oil is to drive the apparatus of this invention along the ground via a drive sprocket 21 and chain belt 22 to a driven sprocket 20 which drives front wheels 13. Other uses of pressurized oil are discussed below.

Figure 5:
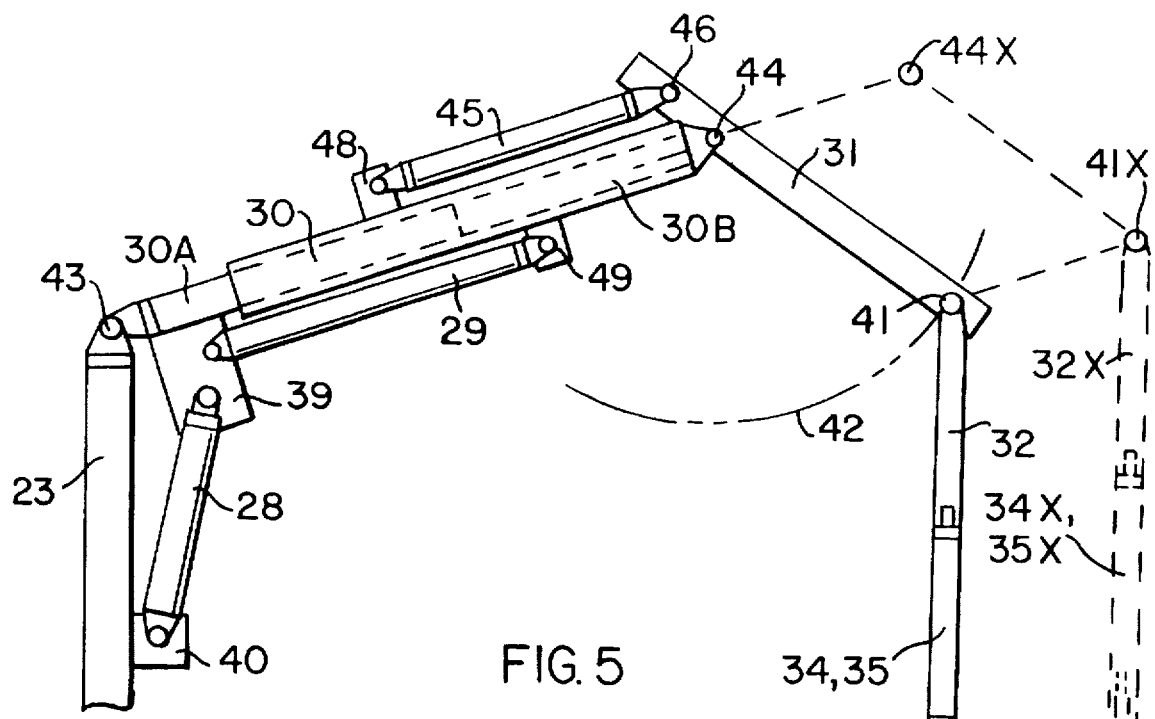
FIG. 5 is a side elevational view of the articulated boom of the apparatus of this invention.
Figure 6:
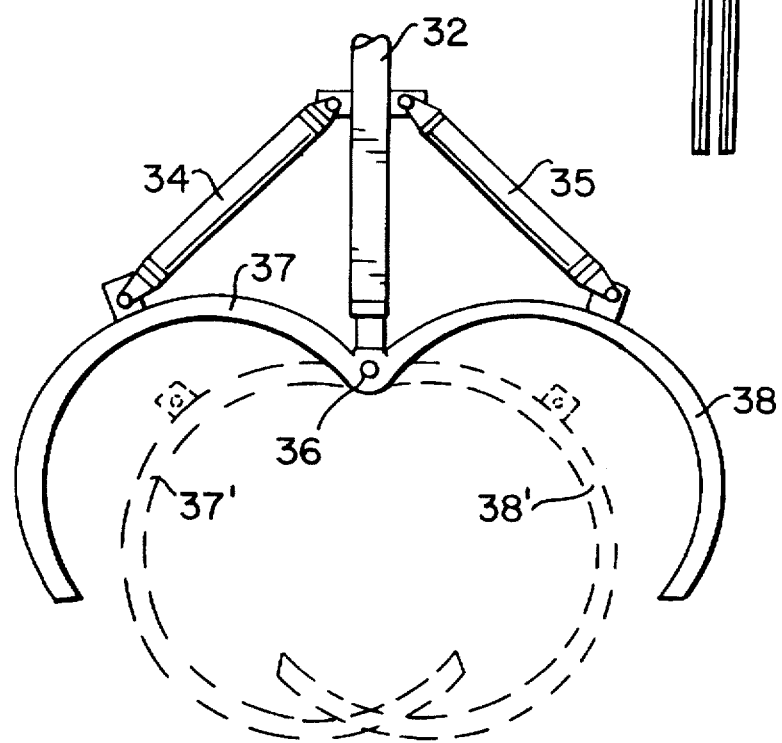
FIG. 6 is a rear elevational view of the grapple fingers on the boom shown in FIG. 5.

FIGS. 5 and 6 show the principal working parts of this apparatus used to lift and place logs, branches, etc. into the carrying spaced of body 10. The working mechanism of this apparatus is an articulated hydraulic beam suspended from the upper end of mast 23. The beam shown in FIG. 5 has three sections; namely inner section 30, middle section 31, and outer section 32. These sections are hinged to each other and operated by a group of hydraulic cylinders controlled by levers 27 (see FIGS. 1-4). Inner section 30 is a telescopic beam having a stationary portion 30A and an extensible portion 30B operated by hydraulic cylinder 29 having its inner end pivotally connected to fixed plate 39 and its outer end pivotably connected to plate 49. Plate 39 is stationary and is, affixed to portion 30A, while plate 49 is rigidly connected to extensible portion 30B. Thus, by supplying pressurized oil to cylinder 29 extensible portion 30B may be moved (to the right in the drawing) to extend the length of middle section 30. Cylinder 28 is connected through plates 39 and 40 to middle section 30 and to mast 23 respectively. Application of pressurized oil to cylinder 28 will cause inner section 30 to pivot upwardly around pin 43.

Middle section 31 is a simple lever beam with three pivot pin connections to portions of the articulated hydraulic beam of this invention. The upper end of beam 31 is connected pivotally to cylinder 45. The middle pin 44 pivotally connects beam 31 to extensible portion 30B of inner section 30. The lower end of beam 31 is pivotally connected to outer section 32. Thus, beam 31 may be moved to the right by the action of cylinder 29 on extensible portion 30B, moving pivot 44 to extended position 44x, pivot 41 to extended position 41x, outer section 32 to position 32x, hydraulic cylinder 34, 35 to position 34x, 35x, and grapple fingers 33 to position 33x. Cylinder 45 may be activated to extend pivot 46 to the right causing beam 31 to pivot around pivot 44 causing pivot 41 to swing in an arc 42. The combined actions of cylinders 29 and 45 and cylinder portion 30B on beam 31 can produce an infinite number of combinations to position pivot 41 any place desired. Outer beam 32 is merely a convenient connection to join middle beam 31 to grapple fingers 33. FIG. 6 shows the operational features of outer beam 32. Grapple fingers 33 may be any combination of opposed fingers that work together to pick up loads. The simplest of such combinations is pictured here as a single finger 37 which interleaves between double fingers 38 so they may pivot together through pivot 36 and as shown by dotted lines, to clamp the item or bundle being picked up. Other suitable arrangements are also operable, such as multiple spaced fingers on each side 37 and 38 that will interleave when closed as shown in dotted lines. A single finger 37 might be operable with a single finger 38 if all connecting pins are tight and no play is permitted, but such an arrangement is not practical and so the simplest arrangement is that shown in FIGS. 5 and 6. As may be seen there is a hydraulic cylinder 34, 35 for each set of fingers (or finger) 37, 38. Generally cylinders 34 and 35 are activated together so as to close or open simultaneously.

Mounted on the apparatus of this invention is a reservoir tank of oil 26 for use in operating the various hydraulic cylinders mentioned above and shown in the drawings. Oil from the reservoir is pumped by a suitable gear pump through the bank of control valves (27 in FIGS. 1–3) to the various hydraulic cylinders. The gear pump is driven by gasoline engine 47. Six control valves 27 are shown here and are used for the following purposes.

1) One valve is used to direct oil to cylinder 28 to raise and lower the articulated boom of sections 30, 31 and 32.

2) One valve is used to direct oil to cylinder 29 to lengthen telescoping section 30 as desired.

3) One valve is used to direct oil to cylinder 45 to pivot section 31 around pivot 44.

4) One valve used to feed both of cylinders 34 and 35 to close the grapple fingers 37 and 38.

5) One valve is used to direct oil to steering cylinder 50 which steers wheels 13.

6) One valve is used to direct oil to the turbine (not shown) that drives the axle connecting wheels 13.

Other auxiliary equipment associated with oil pumps and with internal combustion engines is employed in this invention, but is not specifically identified because it is well known standard equipment that is not necessary to be mentioned for a full understanding of the invention. All of the important equipment has been mentioned, shown and/or described above.

In summary this apparatus may perform in wooded areas but was developed in view of the needs of professional arborists, since most work done in wooded areas can be done by larger existing equipment. An arborist contends with lawns, drives, walks, backyards, fences and narrow gates. This machine provides self-powered and wide pneumatic tires, limited steering movement and overall lightweight construction so as to minimize any damage to lawns, walks and drives. The machine must have a width less than a maximum of 3 feet; and preferably a width of 34 to 35 inches so that the machine will pass through a typical walk through gate of 36 inches and travel on narrow sidewalks around homes and offices. This machine eliminates much of the hand manual labor that can travel around homes and offices, load large sections of wood and other tree debris and move it to the curb so a truck can pick it up and haul it away. This machine can carry over 1500 pounds. The user does not have to cut the debris or tree trunks into small pieces for men to remove by hand.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by letters patent of the U.S. is:

1. A maneuverable self-propelled apparatus for transporting tree debris from urban pruning and removal operations, the apparatus comprising a long, narrow body with high sidewalls, a steerable unitary fixed undercarriage for said body movable on four ground-engaging wheels, an upright non-rotatable mast mounted on said undercarriage, a multi-jointed extensible arm maneuverable by hydraulic cylinders and having one end thereof pivotally attached to said mast and terminating in a pair of hydraulically closeable grapple fingers, means for steerably driving said apparatus, means for providing pressurized fluid for all hydraulic cylinders of the apparatus, and motor driven means for providing power for all operations of the apparatus.

2. The apparatus of claim 1 in which said body has an open top, an open rear, and three sidewalls.

3. The apparatus of claim 1 in which said multi-jointed arm includes a telescopic section.

4. The apparatus of claim 1 in which said long narrow body has a maximum width of less than three feet.

5. The apparatus of claim 1 wherein said means for steerably driving comprises a hydraulic motor for driving two of said four wheels adjacent one end of said undercarriage, and a hydraulic cylinder for steering said two wheels.

6. The apparatus of claim 1 wherein said motor driven means is a gasoline internal combustion engine.

7. A maneuverable self-propelled narrow vehicle for receiving and transporting debris from urban pruning and removal operations comprising a long, narrow, high-walled rectangular body having vertical walls on the front and two sides, an open rear end, and an open top; said body mounted on a unitary fixed undercarriage having two widely spaced pair of two closer spaced ground-engaging wheels, and a driver platform forwardly of said front; a vertical non-rotatable mast positioned adjacent said front wall and midway between said sidewalls, and having an articulated arm of at least three sections selectively powered and positioned by hydraulic cylinders, and terminating in a two-pronged grapple powered to open and close by at least one hydraulic cylinder; means including a hydraulic cylinder for steering one said pair of wheels of said apparatus, a hydraulic motor for driving said one pair of wheels, a gasoline powered internal combusion engine driving a gear pump to provide pressurized fluid for all hydraulic cylinders and said hydraulic motor of said apparatus, and control means above and adjacent said platform generally located at mast height for operating each said hydraulic cylinder separately.

8. The apparatus of claim 7 wherein one of said sections of said articulated arm is an extendable telescopic section of a hydraulic cylinder.

9. The apparatus of claim 7 wherein the internal space in said body measures about 3 feet wide by 7 feet long by 4¾ feet high.

10. The apparatus of claim 7 wherein said wheels include wide pneumatic tires.

11. A steerable self-propelled narrow apparatus for loading and transporting limbs and trunks of trees from urban pruning and tree removal operations at homesites, the apparatus comprising an elongated narrow body with a front end wall and two side walls attached thereto and extending to an open rear end, said front and side walls extending upwardly at least equal to the width of said front end wall and terminating at an open top, unitary fixed undercarriage for supporting said body, said undercarriage including two sets of spaced ground-engaging wheels for supporting said undercarriage adjacent said rear end and said front end wall, means for steering at least one of said sets of wheels, said apparatus including an upright non-rotatable mast supported by said undercarriage adjacent said front end wall, an extendable boom having opposite ends with one said end being attached by a pivot to another of said boom ends, a grapple including at least a pair of fingers connected by a pivot to a free end of said jointed arm, each said pivot extending horizontally and being parallel to each other, hydraulic means for operating said means for steering and for controlling extension and retraction of said extendable boom and for controlling the movement of said at least a pair of fingers to grip and release limbs and trunks from the ground and into said body via said open rear end, and motor driven means for providing power to said hydraulic means.

12. The apparatus of claim 11 wherein said grapple includes a pair of spaced fingers and another finger oppositely disposed and adapted to enter the space between said pair of fingers, and pivotal connection means for attaching each said finger to said free end of said jointed arm.

13. The apparatus of claim 12 wherein said hydraulic means includes a pair of hydraulic cylinders each having an end respectively connected to said pair of fingers and said another finger and having another end connected to said jointed arm, said pair of hydraulic cylinders being extendable and retractable simultaneously.

14. The apparatus of claim 11 wherein said jointed arm extends to an end portion beyond its pivotal attachment with said boom, said hydraulic means including a hydraulic cylinder attached between said extendable portion of said boom and pivotally attached to said end portion of said jointed arm.

15. The apparatus of claim 11 wherein said hydraulic means includes a hydraulic cylinder attached between stationary and movable portions of said extendable boom and another hydraulic cylinder pivotally attached at each end respectively to said mast and said stationary portion of said extendable boom.

16. The apparatus of claim 11 wherein said wheels are wide pneumatic tires inset from said side walls and spaced no wider than the width of said body.

17. The apparatus of claim 11 wherein said body includes a bottom having a flat central section located between said wheels of each said set of wheels and an inclined section between said central section and bottom edges of each said side wall.

18. The apparatus of claim 11 wherein said hydraulic means includes control valves for operating a plurality of hydraulic cylinders and a hydraulic motor for powering said apparatus, one of said hydraulic cylinders defining said means for steering, a second of said hydraulic cylinders for extending and retracting said boom, and a third of said cylinders for moving said at least a pair of fingers.

19. The apparatus of claim 18 wherein a fourth of said cylinders moves said extendable boom about a pivot to raise and lower same, and a fifth of said cylinders moves said jointed arm about a pivot attached to said another end of said boom ends.

20. The apparatus of claim 11 wherein said hydraulic means includes control valves for operating a plurality of hydraulic cylinders and a hydraulic motor for powering said apparatus to move on its wheels on the ground, said apparatus including a driver platform upon which a driver may stand positioned spacedly forwardly of said mast, said control valves being positioned above said platform between said mast and said platform and generally at the height of said mast.

* * * * *